US007581469B1

(12) United States Patent
Clayborn

(10) Patent No.: US 7,581,469 B1
(45) Date of Patent: Sep. 1, 2009

(54) CLAMP GRIPPING AND ACTUATING TOOL ASSEMBLY

(76) Inventor: Charles B. Clayborn, 12141 Onyx Cir., Garden Grove, CA (US) 92845

(*) Notice: Subject to any disclaimer, the term of this patent is extended or adjusted under 35 U.S.C. 154(b) by 0 days.

(21) Appl. No.: 12/145,574

(22) Filed: Jun. 25, 2008

(51) Int. Cl.
*B25B 7/04* (2006.01)
*B23P 19/04* (2006.01)

(52) U.S. Cl. .......................................... 81/426; 29/268

(58) Field of Classification Search .................. 81/426, 81/421, 484, 486, 488, 7; 29/268, 283; 294/99.2, 294/100
See application file for complete search history.

(56) References Cited

U.S. PATENT DOCUMENTS 397,191 A * 2/1889 Leach et al. ..................... 81/7
2,386,570 A * 10/1945 Petrie .......................... 29/268
2,814,860 A * 12/1957 McCaleb .................... 29/268
3,919,903 A 11/1975 McAlister
4,079,765 A 3/1978 Hatayan
4,240,190 A 12/1980 Bray
D298,408 S 11/1988 Johnston
5,277,089 A 1/1994 McGushion
5,537,727 A 7/1996 Mayer
5,937,716 A 8/1999 Klann
7,104,166 B1 9/2006 Wong

* cited by examiner

*Primary Examiner*—David B Thomas

(57) ABSTRACT

A clamp gripping and actuating tool assembly includes a first arm and a second arm pivotally coupled together. Each of the first and second arms has a first end and a second end. A portion of the first and second arms define heads. The head of the first arm has an upper side that is concavely arcuate to be bowl shaped. An arcuate rod having a pair of ends extends through the head of the second arm and is positioned between the lower side and a top side of the head of the second arm. One of the ends is extendable forward of the head of the first arm. A fastener is extended through openings in a plurality of clamps as the clamps are closed between the heads. The fastener is supported by the upper side of the head of the first arm.

5 Claims, 7 Drawing Sheets

CLAMP GRIPPING AND ACTUATING TOOL ASSEMBLY

BACKGROUND OF THE INVENTION

Field of the Invention

The present invention relates to clamp manipulating tools and more particularly pertains to a new clamp manipulating tool for assisting a person in closing and securing a plurality of clamps in a manner that leaves one hand of a user of the tool free.

SUMMARY OF THE INVENTION

The present invention meets the needs presented above by generally comprising pliers that includes a first arm and a second arm pivotally coupled together. Each of the first and second arms has a first end and a second end. A portion of the first and second arms positioned adjacent to the first ends define heads while a portion of the first and second arms adjacent to the second ends define handles. The heads move toward each other when the grips are moved toward each other. The head of the first arm has an upper side that is concavely arcuate to be bowl shaped. A lower side of the head of the second arm is planar. An arcuate rod extends through the head of the second arm. The arcuate rod has a pair of ends. The ends are positioned between the lower side and a top side of the head of the second arm and are extendable outwardly from the head of the second arm. The rod is slidably mounted in the head of the second arm to selectively allow a direction of extension of a hook member formed by the rod. A fastener is extended through openings in a plurality of clamps as the clamps are closed between the heads. The fastener is supported by the upper side of the head of the first arm.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
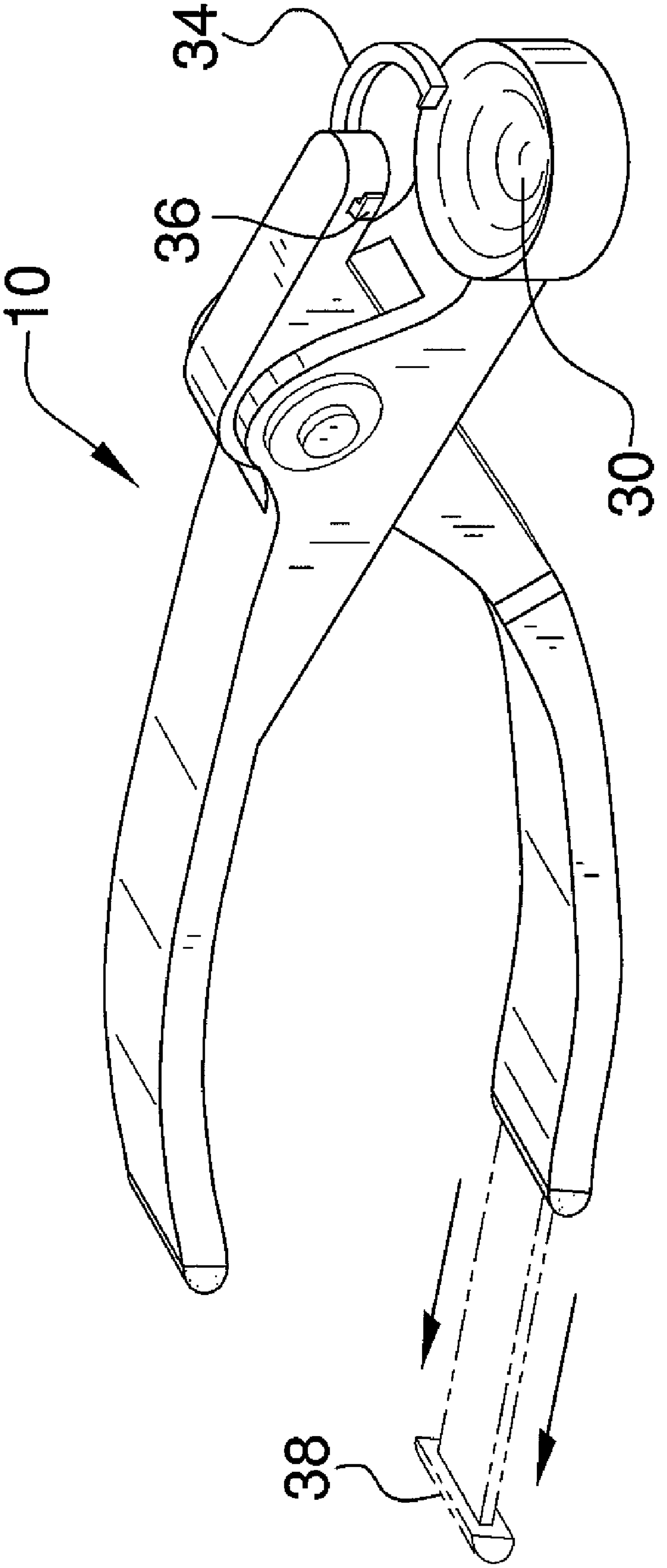
FIG. 1 is a front perspective in-use view of a clamp gripping and actuating tool assembly according to the present invention.

With reference now to the drawings, and in particular to FIGS. 1 through 10 thereof, a new clamp manipulating tool embodying the principles and concepts of the present invention and generally designated by the reference numeral 10 will be described.

As best illustrated in FIGS. 1 through 10, the clamp gripping and actuating tool assembly 10 generally comprises pliers 12 that include a first arm 14 and a second arm 16 pivotally coupled together. Each of the first 14 and second 16 arms has a first end 18 and a second end 20. A portion of the first 14 and second 16 arms positioned adjacent to the first ends 18 define heads 22, 24 and a portion of the first 14 and second 16 arms adjacent to the second ends 20 define handles 26, 28. The heads 22, 24 move toward each other when the grips 26, 28 are moved toward each other. The head 22 of the first arm 14 has an upper side 30 that is concavely arcuate so that is bowl shaped. A lower side 32 of the head 24 of the second arm 16 is planar.

An arcuate rod 34 extends through the head 24 of the second arm 16. The rod 34 forms an approximate half circle. The arcuate rod 34 has a pair of ends 36, 37. The ends 36, 37 are positioned between the lower side 32 and a top side 33 of the second arm 16. One of the ends 36, 37 may be extended forward of the head 24 as is shown in the Figures to form a hook member. The rod 34 is slidably mounted in the head 24 to allow selection of direction of the hook formed by the rod 34. The rod has a non-circular cross-section to prevent it from pivoting with respect to the head 24 of the second arm 16. The ends 36, 37 are larger than a remaining portion of the rod 34 to prevent the rod 34 from being removed from the head 24.

A pair of fastener grips 38 is provided to assist a person in manipulating a fastener 50 extending through a clamp 52. Each of the fastener grips 38 is elongated and has a notched end 40 for engaging a fastener 50. Each of the fastener grips 38 is removably extended into one of the second ends 20 of the first 18 and second 20 arms. The fastener grips 38 each have a distal end 42 with respect to an associated one of the notched ends 40. The distal ends 42 are a bulbous member comprising a resiliently compressible material. The resiliently compressible material prevents the distal ends 42 from damaging items being worked on and provides for easy removal of the fastener grips 38 from the first 14 and second 16 handles.

Figure 2:
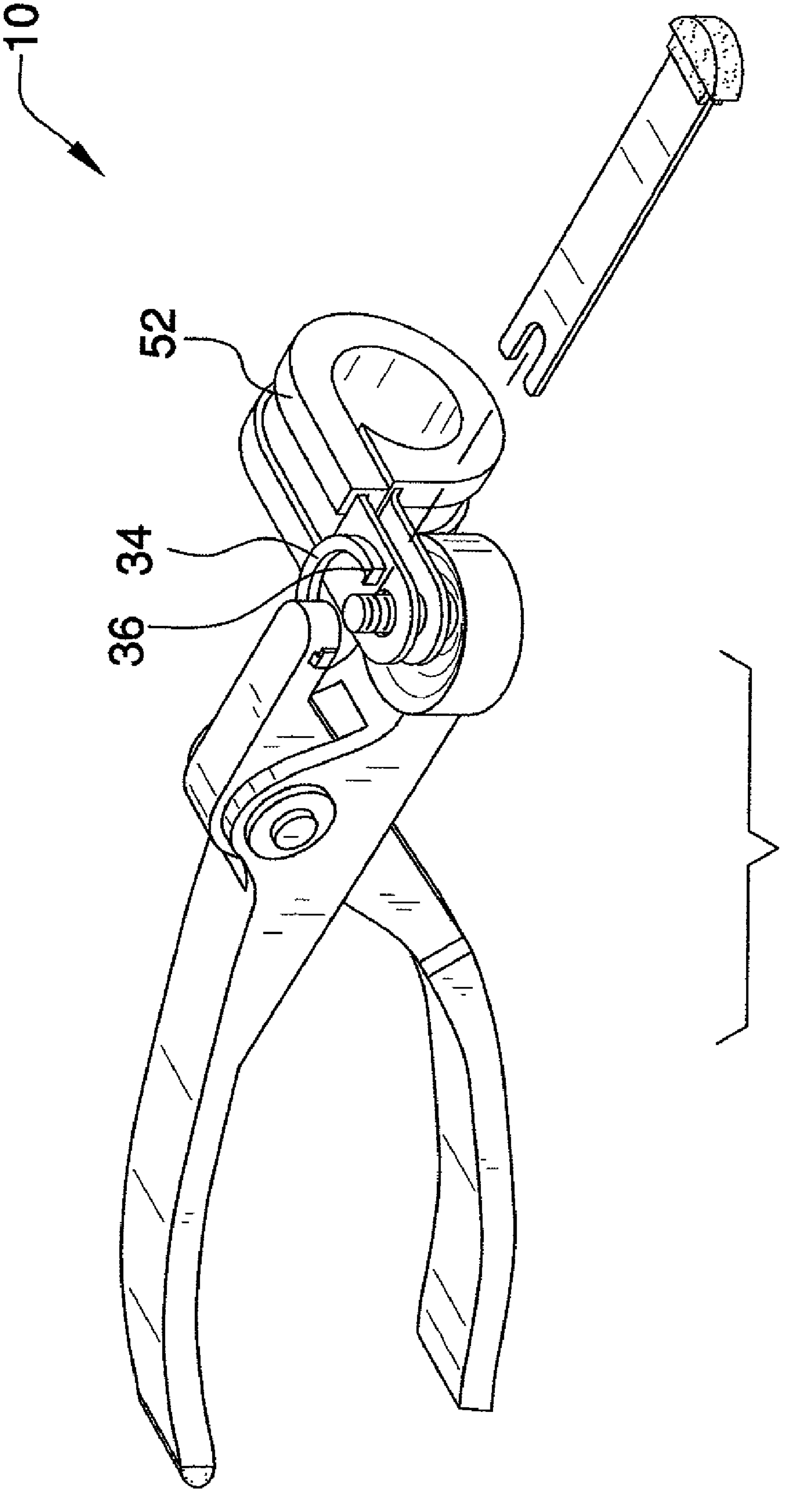
FIG. 2 is a front perspective view of the present invention.
Figure 3:
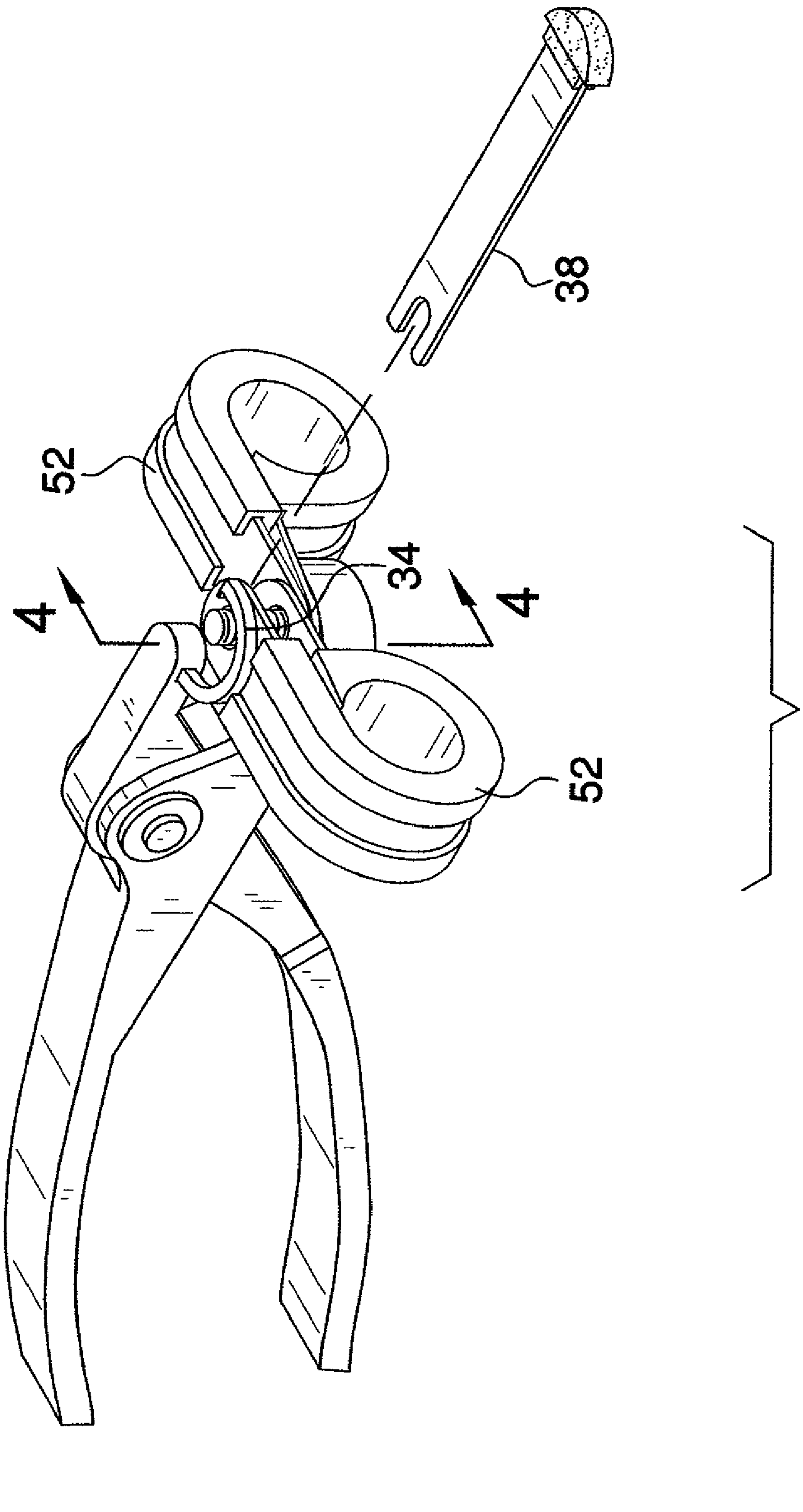
FIG. 3 is a front perspective view of the present invention.
Figure 4:
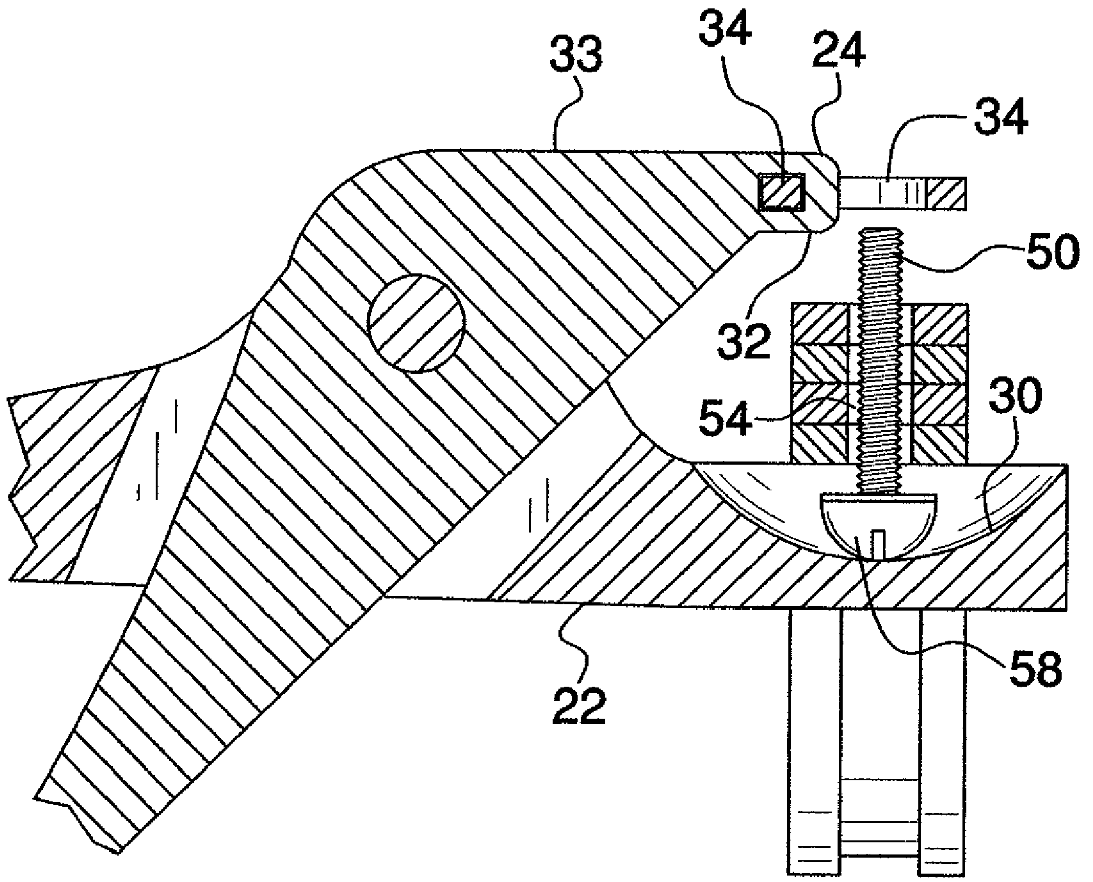
FIG. 4 is a cross-sectional view taken along line 4-4 of FIG. 3 of the present invention.
Figure 5:
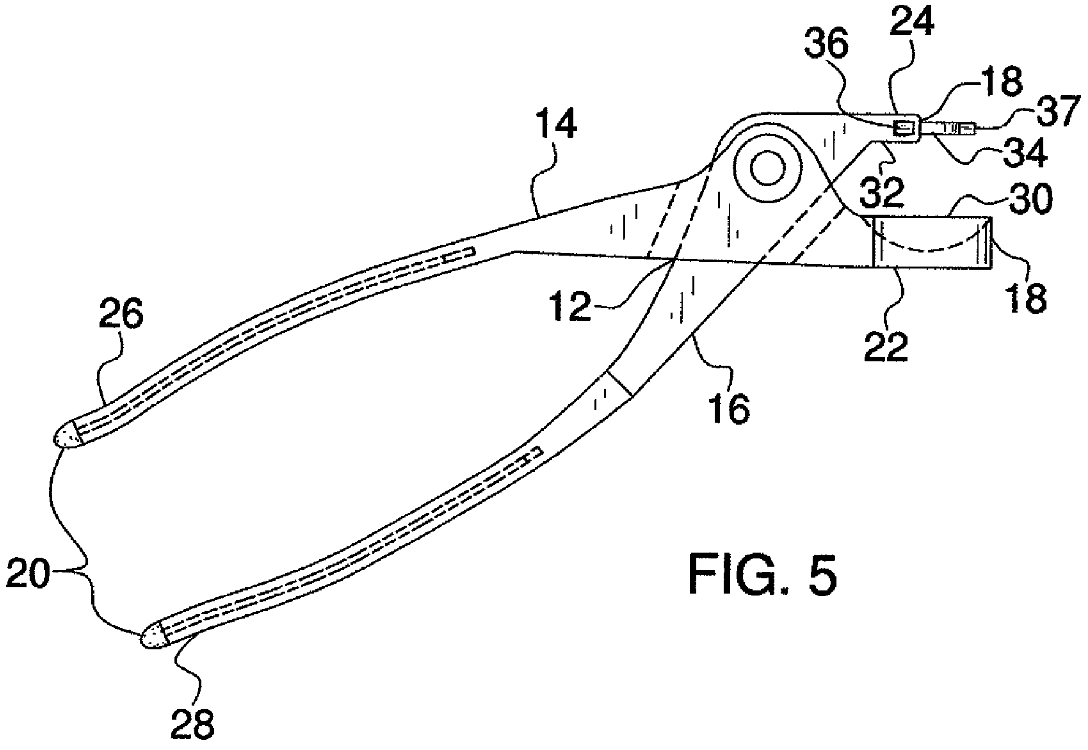
FIG. 5 is a side view of the present invention.
Figure 6:
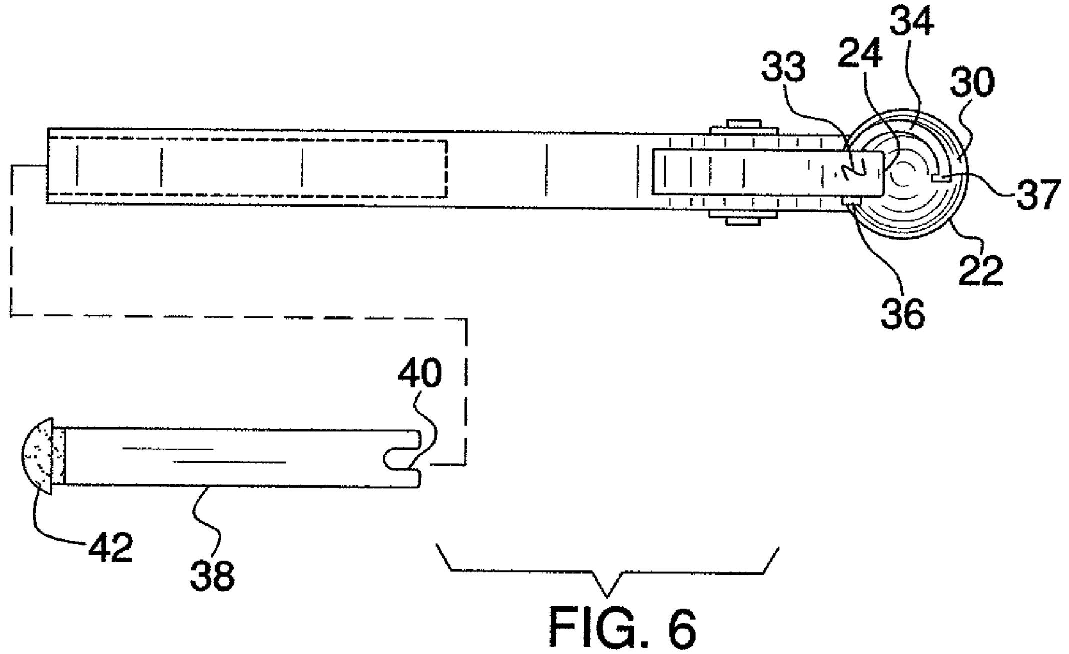
FIG. 6 is a top view of the present invention.
Figure 7:
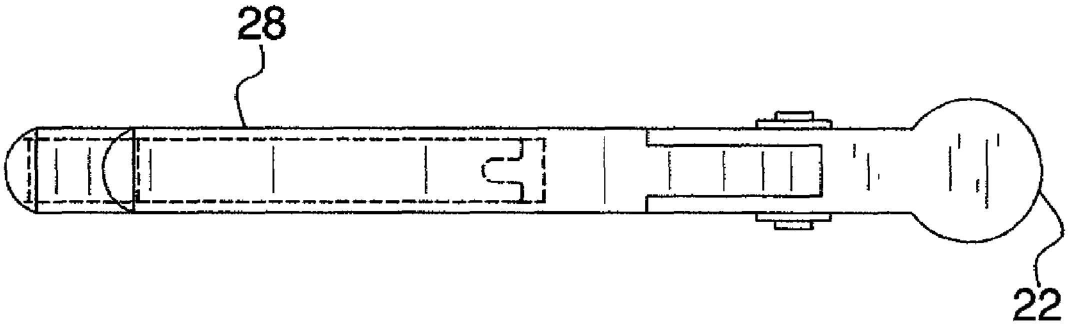
FIG. 7 is a bottom view of the present invention.
Figure 8:
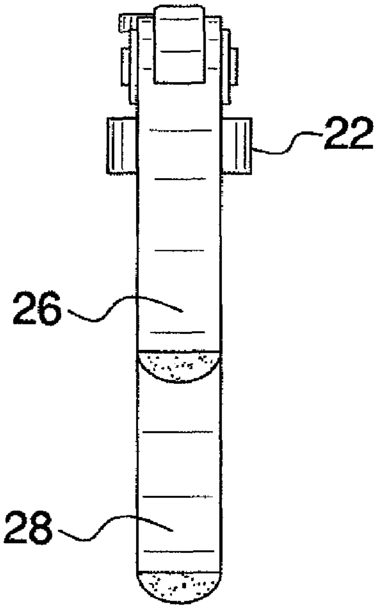
FIG. 8 is a rear view of the present invention.
Figure 9:
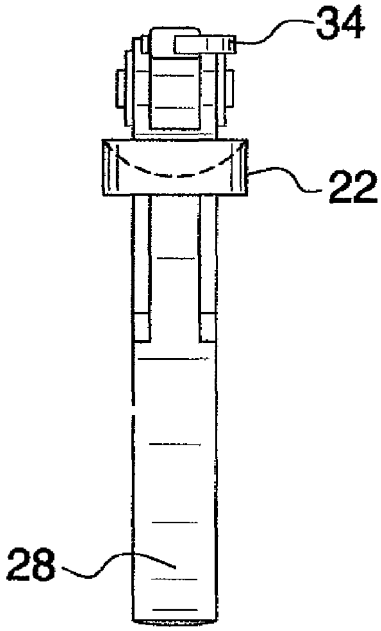
FIG. 9 is a front view of the present invention.
Figure 10:
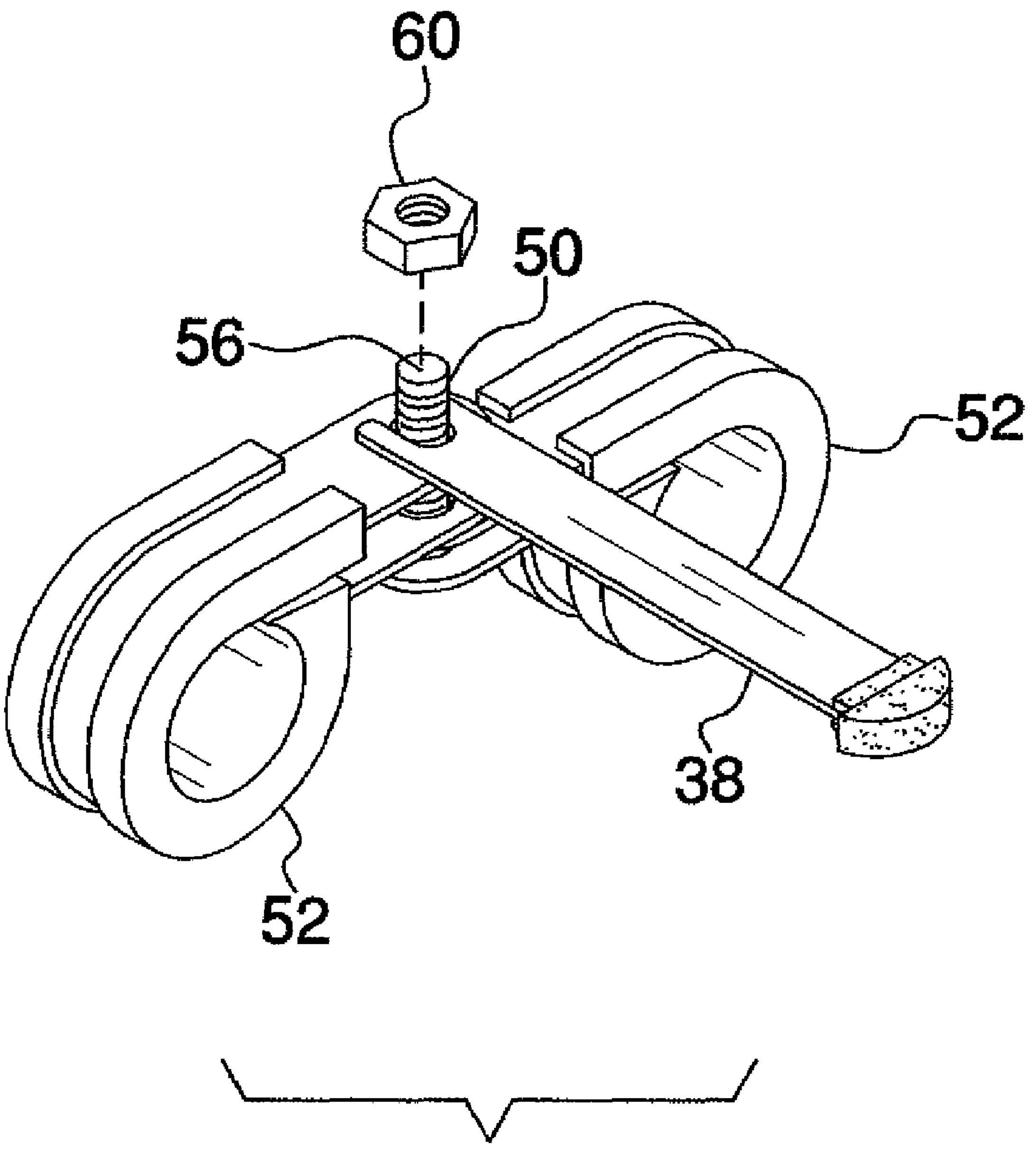
FIG. 10 is a front perspective view of clamps of the present invention.

In use, a fastener 50 is extended through openings 54 in a plurality of clamps 52 as the clamps 52 are closed between the heads 22, 24 with the assistance of the rod 34 which holds the clamps 52 in a closed configuration so that additional clamps 52 may be positioned on the fastener 50. The fastener 50 is supported by the upper side 30 of the head 22 of the first arm 14. The bowl shaped head of the first arm 14 retains the fastener 50 while the rod 34 creates a space between an end 56 of the fastener 50 and the head 24 of the second arm 16 to allow a nut or additional clamps 52 to be positioned on the fastener 50. The assembly 10 allows clamps, used for items such as retaining a plurality of wires, to be manipulated within small areas. The arcuate rod 34 is used as shown in FIGS. 2 and 3 to first hold a first clamp and then a second clamp by moving the ends 36, 37 from one position to another relative to the head 24. The fastener grips 38 can be used to hold the clamps down on the fastener 50 so that the clamps 50 can be removed from the assembly 10 and a nut 60 put on the fastener 50. The notch 40 may be engaged with the threads of the fastener 50, above the clamp 52, to secure the clamp 52 between the fastener grip 38 and a head 58 of the fastener 50.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A clamp and fastener manipulating tool comprising:

a pliers including a first arm and a second arm pivotally coupled together, each of said first and second arms having a first end and a second end, a portion of said first and second arms positioned adjacent to said first ends defining heads, a portion of said first and second arms adjacent to said second ends defining handles, said heads moving toward each other when said grips are moved toward each other, said head of said first arm having an upper side being concavely arcuate to be bowl shaped, a lower side of said head of said second arm being planar;

an arcuate rod extends through said head of said second arm, said rod forming approximate half circle, said rod having a pair of ends, said ends being positioned between said lower side and a top side of said second arm, one of said ends being extendable forward of said head of said second arm to form a hook member, said rod being slidably mounted in said head of said second arm to selectively allow a direction of extension of said hook member formed by said rod; and wherein a fastener is extended through openings in a plurality of clamps as the clamps are closed between said heads and the fastener is supported by the upper side of said head of said first arm.

2. The tool according to claim 1, further including at least one fastener grip being elongated and having a notched end for engaging a fastener, said at least one fastener grip being removably extended into one of said second ends of said first and second arms.

3. The tool according to claim 2, wherein said at least one fastener grip has a distal end with respect to an associated one of said notched ends, said distal end being a bulbous member.

4. The tool according to claim 3, wherein bulbous member of said at least one fastener grip each comprise a resiliently compressible material.

5. A clamp and fastener manipulating tool comprising:

a pliers including a first arm and a second arm pivotally coupled together, each of said first and second arms having a first end and a second end, a portion of said first and second arms positioned adjacent to said first ends defining heads, a portion of said first and second arms adjacent to said second ends defining handles, said heads moving toward each other when said grips are moved toward each other, said head of said first arm having an upper side being concavely arcuate to be bowl shaped, a lower side of said head of said second arm being planar;

an arcuate rod extends through said head of said second arm, said rod forming approximate half circle, said rod having a pair of ends, said ends being positioned between said lower side and a top side of said second arm, one of said ends being extendable forward of said head of said second arm to form a hook member, said rod being slidably mounted in said head of said second arm to selectively allow a direction of extension of said hook member formed by said rod, said ends of said rod being larger than a remaining portion of said rod to prevent said rod from being removed from said head of said second arm;

a pair of fastener grips, each of said fastener grips being elongated and having a notched end for engaging a fastener, each of said fastener grips being removably extended into one of said second ends of said first and second arms, each of said fastener grips having a distal end with respect to an associated one of said notched ends, said distal ends being a bulbous member comprising a resiliently compressible material; and wherein a fastener is extended through openings in a plurality of clamps as the clamps are closed between said heads and the fastener is supported by the upper side of said head of said first arm.

* * * * *